(12) United States Patent
Tsubouchi (10) Patent No.: US 10,467,650 B2
(45) Date of Patent: Nov. 5, 2019

(54) INFORMATION PROCESSING APPARATUS, INFORMATION PROCESSING METHOD, AND NON-TRANSITORY COMPUTER READABLE STORAGE MEDIUM

(71) Applicant: YAHOO JAPAN CORPORATION, Tokyo (JP)

(72) Inventor: Kota Tsubouchi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 989 days.

(21) Appl. No.: 14/847,918

(22) Filed: Sep. 8, 2015

(65) Prior Publication Data

US 2016/0086094 A1    Mar. 24, 2016

(30) Foreign Application Priority Data

Sep. 19, 2014    (JP) .................. 2014-191931

(51) Int. Cl.
| | | |
|---|---|---|
| *G06Q 30/02* | (2012.01) | |
| *G06N 5/02* | (2006.01) | |
| *G06N 20/00* | (2019.01) | |

(52) U.S. Cl.
CPC ......... *G06Q 30/0242* (2013.01); *G06N 5/025* (2013.01); *G06N 20/00* (2019.01)

(58) Field of Classification Search
CPC .............. G06Q 50/01; G06Q 10/0833; G06Q 30/0283; G06Q 30/0617; G06Q 10/00; G06Q 10/06; G06Q 10/10; G06Q 10/101; G06Q 20/00; G06Q 20/02; G06Q 20/14; G06Q 20/223; G06Q 30/02; G06Q 30/0242; G06Q 30/06; G06Q 30/08; G06Q 50/188; G06N 7/005; G06N 99/005; G06N 5/025; G06N 20/00; G06F 17/30551; H04W 4/023; H04W 4/029; H04W 4/38; H04L 67/22

See application file for complete search history.

(56) References Cited

U.S. PATENT DOCUMENTS

| | | | | |
|---|---|---|---|---|
| 2012/0023043 A1* | 1/2012 | Cetin | ............... | G06N 7/005 706/12 |
| 2015/0213361 A1* | 7/2015 | Gamon | ............... | G06N 99/005 706/12 |

FOREIGN PATENT DOCUMENTS

| | | |
|---|---|---|
| JP | 2009-193465 A | 8/2009 |
| JP | 2010-198243 A | 9/2010 |

(Continued)

OTHER PUBLICATIONS

Aug. 16, 2016 Japanese Written Opinion issued in Japanese Patent Application No. 2014-191931.

(Continued)

*Primary Examiner* — Hal Schnee
(74) *Attorney, Agent, or Firm* — Oliff PLC (57) ABSTRACT

An information processing apparatus includes: a model generation unit configured to generate a prediction model for calculating a prediction value related to a probability that a user performs an action on the Internet by operating a user terminal, for each group created by grouping users based on user information; a model selection unit configured to select a prediction model suited to the user from the prediction models; and a prediction value calculation unit configured to calculate the prediction value by using the prediction model selected by the model selection unit.

11 Claims, 4 Drawing Sheets

(56) References Cited

FOREIGN PATENT DOCUMENTS

| | | |
|---|---|---|
| JP | 2010-211679 A | 9/2010 |
| JP | 2013-210940 A | 10/2013 |
| WO | 2009/060829 A1 | 5/2009 |

OTHER PUBLICATIONS

Aug. 21, 2018 Office Action issued in Japanese Patent Application No. 2017-079037.
Mar. 19, 2019 Office Action issued in Japanese Patent Application No. 2017-079037.

* cited by examiner

INFORMATION PROCESSING APPARATUS, INFORMATION PROCESSING METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-191931 filed in Japan on Sep. 19, 2014.

BACKGROUND OF THE INVENTION

1. Field of the Invention

The present invention relates to an information processing apparatus, information processing method, and non-transitory computer-readable storage medium that predicts an action that a user performs on the Internet by operating a user terminal.

2. Description of the Related Art

Information providing apparatuses that provide advertisements to users via the Internet have been conventionally known (see Japanese Laid-open Patent Publication No. 2009-193465).

Such information providing apparatuses include one that calculates a prediction value of a probability that a user clicks an advertisement on a web page and provides the user with an advertisement in accordance with the calculated prediction value for the purpose of improving advertising effects. In order to calculate the prediction value, a prediction model is used which calculates a prediction value based on features indicating a user attribute, relativity between the user attribute and the advertisement, and the like.

However, a prediction model common to all users has been conventionally used to calculate a prediction value. Hence, the prediction model is required to include an enormous number of features to handle users having various attributes. Consequently, there is a problem that the time to calculate the prediction value is long.

SUMMARY OF THE INVENTION

It is an object of the present invention to at least partially solve the problems in the conventional technology.

According to one aspect of an embodiment, an information processing apparatus includes a model generation unit configured to generate a prediction model for calculating a prediction value related to a probability that a user performs an action on the Internet by operating a user terminal, for each group created by grouping users based on user information; a model selection unit configured to select a prediction model suited to the user from the prediction models; and a prediction value calculation unit configured to calculate the prediction value by using the prediction model selected by the model selection unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

A first embodiment is described hereinafter based on the drawings.

Information Processing Apparatus

Figure 1:
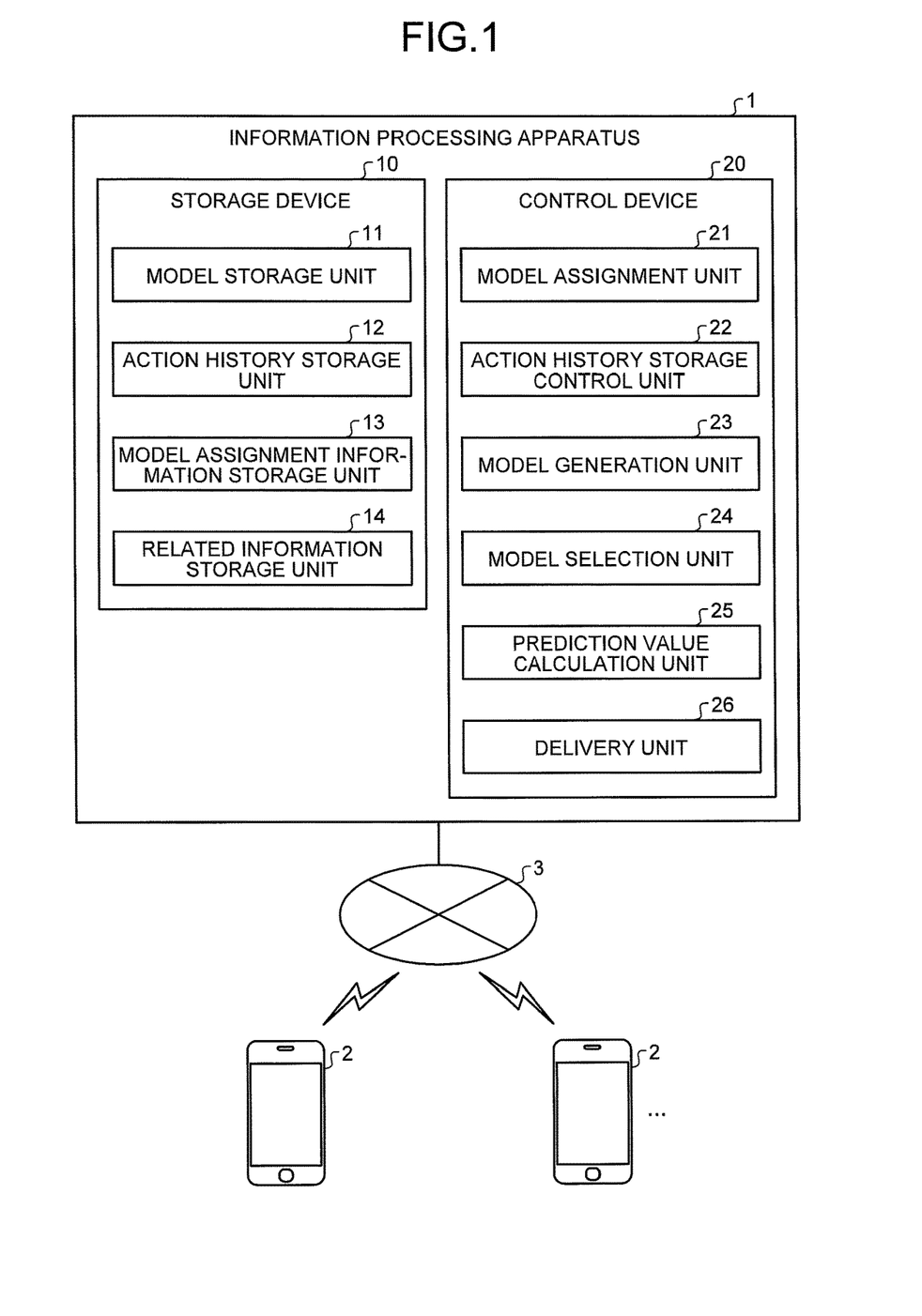
FIG. 1 is a diagram illustrating the configuration of an information processing apparatus according to a first embodiment.

FIG. 1 is a diagram illustrating the configuration of an information processing apparatus according to the first embodiment. An information processing apparatus 1 of the first embodiment is configured of a computer, and includes a storage device 10 and a control device 20. In terms of the information processing apparatus 1, a plurality of user terminals 2 is connected to a network 3 that can be connected for communication.

Storage Device

The storage device 10 is configured of an HDD (Hard Disk Drive), a flash memory, or the like. Various programs and pieces of information that are necessary to operate the control device 20 are stored in the storage device 10.

The storage device 10 includes a model storage unit 11, an action history storage unit 12, a model assignment information storage unit 13, and a related information storage unit 14.

A prediction model for calculating a predicted CTR, which is a prediction value of a probability (CTR: Click-Through rate) that a specific user clicks a specific advertisement on a web page, is stored in the model storage unit 11.

The prediction model is shown in, for example, the following equation (1). In equation (1), A and B represent a constant. y is shown in the following equation (2). n represents a variable. Xn represents the numeric features value. Wn represents a weighted coefficient that determines the degree of contribution in which the Xn contribute to the predicted CTR.

$$\text{Predicted } CTR = \frac{1}{1 + \exp(-1 * (Ay + B))} \quad (1)$$

$$y = \sum W_n * X_n \quad (2)$$

The features are various pieces of information related to a user and an advertisement, and is information indicating, for example, a user attribute, a similarity between a delivery target page and an advertisement, relativity between the user attribute and the advertisement, information on the advertisement itself, and a past delivery record.

The prediction model is not necessarily one that obtains the CTR itself as long as it is a prediction model that obtains a prediction value related to the CTR. For example, the prediction model may obtain y shown in equation (2).

A prediction model (also referred to as local model) generated for each group created by grouping users based on user attributes, and a prediction model (also referred to as common model) common to all the groups are stored in the model storage unit 11.

For example, a housewife model generated targeting a group of housewives, and a rich model generated targeting a group of wealthy people can be illustrated as the local model.

A click history (configuring an action history), which indicates a result of clicks on a delivered advertisement when a user accessed a predetermined webpage in the past, is accumulated in the action history storage unit 12 (configuring an action history storage unit). The click history includes pieces of information such as user IDs (Identifiers: identification information), web page IDs, advertisement IDs, the presence or absence of a click, and the date and time of a click.

The click history is accumulated in the action history storage unit 12, associated with a prediction model of either the local model or the common model.

Model assignment information where a user ID is associated with a prediction model assigned to the user by a model assignment process described below is stored in the model assignment information storage unit 13.

Related information where features value acquired by the model assignment process described below is associated with the prediction model assigned by the model assignment process is accumulated in the related information storage unit 14.

Control Device

The control device 20 controls the operation of the information processing apparatus 1, and is configured of a computing device such as a CPU (Central Processing Unit).

The computing device executes an information processing program stored in the storage device 10. Accordingly, the control device 20 functions as a model assignment unit 21, an action history storage control unit 22, a model generation unit 23, a model selection unit 24, a prediction value calculation unit 25, and a delivery unit 26.

The model assignment unit 21 uses a history of actions that the user performed on the Internet by operating the user terminal to test the prediction models and assign a prediction model suited to the user.

More specifically, the model assignment unit 21 assigns, to each user, a prediction model suited to the user from the common model and the local models created on a group by group basis. Moreover, the model assignment unit 21 stores, in the model assignment information storage unit 13, model assignment information that associates the user with the assigned prediction model.

Moreover, the model assignment unit 21 reads an accumulated click history for each user from the action history storage unit 12, and acquires features value based on the read click history. The model assignment unit 21 accumulates, in the related information storage unit 14, related information where the acquired features value is associated with the assigned prediction model.

For example, the model assignment unit 21 uses features value acquired from the history of the actions that the user performed on the Internet by operating the user terminal to test the prediction models, assigns a prediction model suited to the user, generates related information where the features value is associated with the assigned prediction model, and accumulates the related information in a storage device, and after the related information is accumulated in the storage device for a predetermined period, assigns a prediction model suited to the user based on the accumulated related information.

For other example, the model assignment unit 21 assigns a prediction model suited to the user based on the related information indicating a relationship between the features value related to the actions that the user performed on the Internet by operating the user terminal, and the prediction model.

The action history storage control unit 22 accumulates, in a storage device, an action history being a history of actions that the user performed on the Internet by operating the user terminal.

Specifically, the action history storage control unit 22 associates the action history with the prediction model selected by the model selection unit 24 and accumulates the action history in the storage device.

When having acquired a click history of a delivered advertisement obtained when the user accessed a predetermined web page, the action history storage control unit 22 (configuring an action history storage control unit) associates the acquired click history with a prediction model selected by the model selection unit 24 described below and accumulates the click history in the action history storage unit 12.

The model generation unit 23 generates a prediction model for calculating a prediction value related to a probability that a user performs an action on the Internet by operating a user terminal, for each group created by grouping users based on user information.

Specifically, the model generation unit 23 generates each prediction model based on its corresponding click history accumulated in the action history storage unit 12, and stores the prediction model in the model storage unit 11.

More specifically, the model generation unit 23 acquires multiple pairs of features value and a click track record based on the accumulated click history, learns the degree of contribution (Wn) of the features to a predicted CTR, and generates a prediction model.

For example, the model generation unit 23 generates a common model common among the groups, as the prediction model. For other example, the model generation unit 23 generates the prediction model based on a corresponding action history accumulated in the storage device.

For other example, the model generation unit 23 generates the prediction model for each group created by grouping the users based on user attributes.

Here, the model generation unit 23 generates a prediction model regularly to overwrite and store the newly generated prediction model in the model storage unit 11.

The model selection unit 24 selects a prediction model suited to the user from the prediction models.

Specifically, the model selection unit 24 selects a prediction model suited to the user based on the model assignment information stored in the model assignment information storage unit 13, or the related information accumulated in the related information storage unit 14.

More specifically, the model selection unit 24 selects a prediction model suited to the user based on the related information indicating the relationship between the features value related to the actions that the user performed on the Internet by operating the user terminal, and the prediction model.

For example, the model selection unit 24 selects the prediction model assigned to the user by the model assignment unit 21.

The prediction value calculation unit 25 calculates the prediction value by using the prediction model selected by the model selection unit 24.

Specifically, when having acquired page access information indicating that the user accessed the predetermined web page, the prediction value calculation unit 25 uses the prediction model selected by the model selection unit 24 to calculate a predicted CTR for each advertisement being a candidate for delivery.

The delivery unit 26 determines and delivers an advertisement to be delivered to the user, based on the predicted CTR calculated by the prediction value calculation unit 25.

For example, the delivery unit 26 delivers, to the user, an advertisement with the highest predicted CTR among the delivery candidate advertisements.

Model Assignment Process

Next, the model assignment process is described.

Figure 2:
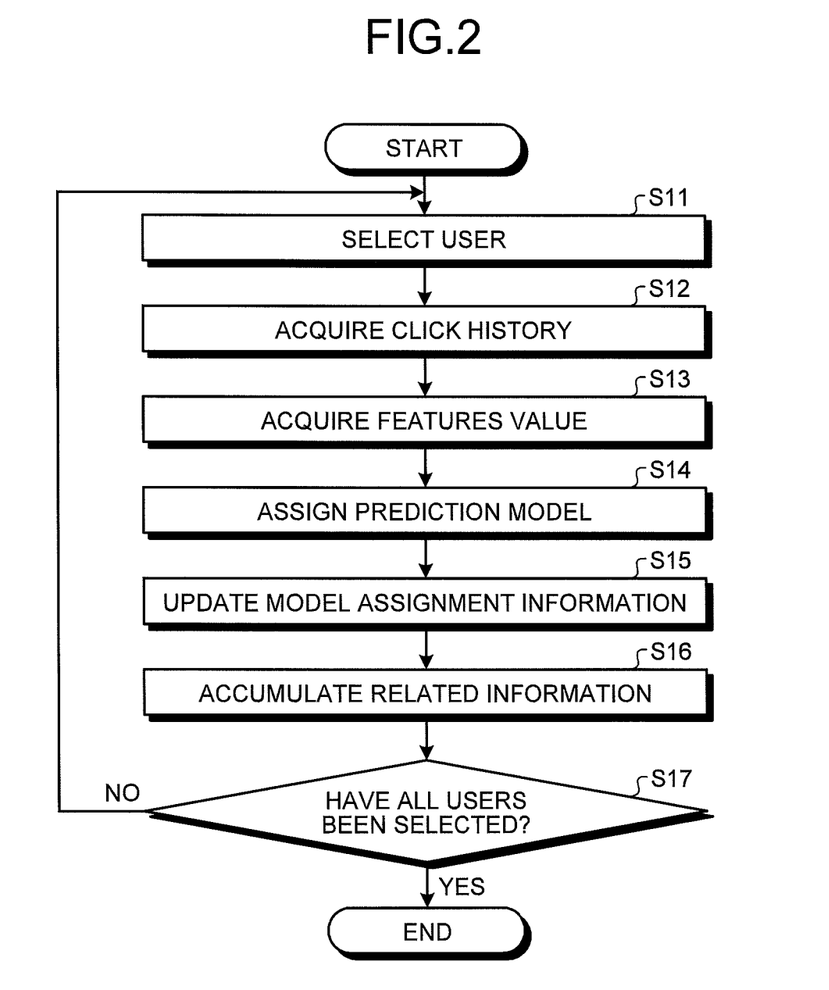
FIG. 2 is a flowchart illustrating a model assignment process in the first embodiment.

FIG. 2 is a flowchart illustrating the model assignment process. The model assignment process is executed at intervals of a predetermined period, for example, one week.

As illustrated in FIG. 2, when the model assignment process is executed, the model assignment unit 21 selects one user from users with click histories accumulated in the action history storage unit 12 (Step S11).

Next, the model assignment unit 21 reads and acquires the accumulated click history of the selected user from the action history storage unit 12 (Step S12), and further acquires the features value based on the acquired click history (Step S13).

Next, the model assignment unit 21 uses the acquired features value to test a plurality of prediction models stored in the model storage unit 11, and assigns a prediction model suited to the user (Step S14).

Specifically, the model assignment unit 21 inputs the acquired features value for each prediction model, and calculates a predicted CTR. The model assignment unit 21 then compares the calculated predicted CTR and an actual value obtained from the acquired click history to assign a prediction model suited to the user from the plurality of prediction models.

For example, the model assignment unit 21 assigns, to the user, a prediction model having the calculated predicted CTR closest to the actual value.

In other words, the model assignment unit 21 assigns a suited local model to the user if any of the local models is suited, and assigns the common model to the user if no local model is suited and the common model is suited.

Next, the model assignment unit 21 stores, in the model assignment information storage unit 13, the model assignment information where the user is associated with the assigned prediction model (Step S15). If the model assignment information corresponding to the user is already stored in the model assignment information storage unit 13, the old model assignment information is overwritten with the new model assignment information.

Furthermore, the model assignment unit 21 accumulates, in the related information storage unit 14, related information where the acquired features value is associated with the assigned prediction model (Step S16).

Next, the model assignment unit 21 determines whether or not all the users having a click history accumulated in the action history storage unit 12 have been selected (Step S17).

If having determined to be NO in Step S17, the model assignment unit 21 returns the processing to step S11, and re-executes the processing from Steps S11 to S17. When all the users were selected and it has been determined to be YES in Step S17, the model assignment process ends.

Prediction Process

Next, the prediction process is described.

Figure 3:
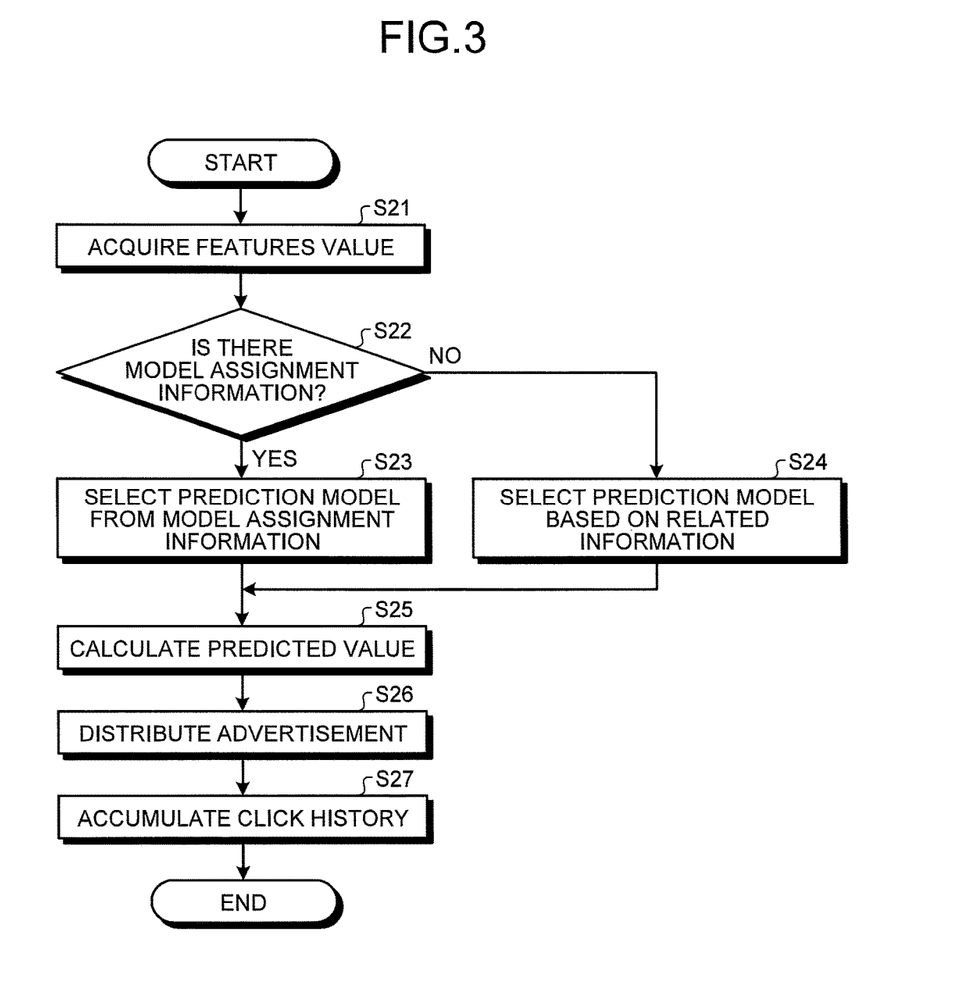
FIG. 3 is a flowchart illustrating a prediction process in the first embodiment.

FIG. 3 is a flowchart illustrating the prediction process. The prediction process is executed when, for example, a user accessed a predetermined web page.

As illustrated in FIG. 3, when the prediction process is executed, the prediction value calculation unit 25 acquires page access information indicating the user accessed the predetermined web page, and acquires features value for each delivery candidate advertisement, based on the acquired page access information (Step S21).

Next, the prediction value calculation unit 25 determines whether or not model assignment information of the target user is stored in the model assignment information storage unit 13 (Step S22).

If having determined to be YES in Step S22, the prediction value calculation unit 25 selects a prediction mode associated with the model assignment information (a prediction model of either the local or common model) (Step S23).

On the other hand, if having determined to be NO in Step S22, the prediction value calculation unit 25 selects a prediction model with high relativity with the acquired features value based on the related information accumulated in the related information storage unit 14.

In other words, if there is a local model with high relativity with the acquired features value, the prediction value calculation unit 25 selects the local model, and if not, the prediction value calculation unit 25 selects the common model.

After the processing of Step S23 or Step S24, the prediction value calculation unit 25 uses the prediction model selected in Step S23 or S24 to calculate a predicted value based on the acquired features value for each delivery candidate advertisement (Step S25).

Next, the delivery unit 26 determines an advertisement to be delivered to the user based on the predicted CTR calculated for each delivery candidate advertisement. For example, the delivery unit 26 determines an advertisement with the highest predicted CTR as a delivery advertisement. The delivery unit 26 then delivers the advertisement to the user (Step S26). A plurality of advertisements may be selected to be delivered.

Next, the action history storage control unit 22 acquires a click history for the delivered advertisement, and accumulates the acquired click history in the action history storage unit 12 (Step S27).

If the prediction model selected in Step S23 or S24 is a local model, the action history storage control unit 22 associates the acquired click history with the common model and the selected local model to accumulate the acquired click history in the action history storage unit 12.

Moreover, if the selected prediction model is the common model, the action history storage control unit 22 associates the acquired click history with the common model to accumulate the acquired click history in the action history storage unit 12.

The control device 20 then ends the prediction process.

Operation and Effect of the First Embodiment

A predicted CTR is calculated based on a prediction model generated for each group (a local model). Accordingly, the number of features to be used for calculation can be reduced, and the time to calculate a predicted CTR can be reduced as compared to a case where a predicted CTR is calculated using the common.

Moreover, a predicted CTR is calculated using a local model suited to a user. Accordingly, the accuracy of a predicted CTR can be improved as compared to the case where a predicted CTR is calculated using the common model targeting users with various attributes.

The model generation unit 23 generates the common model common among groups, as the prediction model.

According to this, a predicted CTR can be calculated with the common model also for users who do not belong to any groups.

The model assignment unit 21 uses a click history of a user to test a prediction model generated for each group, and accordingly assigns a prediction model suited to the user. The model selection unit 24 then selects the prediction model assigned to the user by the model assignment unit 21.

According to this, a prediction model can be selected based on a user's click track record. Accordingly, a prediction model suited to the user can be accurately selected.

The model selection unit 24 selects a prediction model suited to a user based on related information where features value is associated with a prediction model, if there is no model assignment information of the user in the model assignment information storage unit 13.

According to this, a suited prediction model can be selected also for users having no click history accumulated and no model assignment information.

Moreover, there is no need to test prediction models. Accordingly, a prediction model suited to a user can be selected immediately, and the processing load of the test on the control device 20 can be reduced.

The action history storage control unit 22 associates the user's click history with the prediction model selected by the model selection unit 24 and accumulates the click history in the action history storage unit 12. The model generation unit 23 generates each prediction model based on its corresponding click history accumulated in the action history storage unit 12.

According to this, as the click histories are accumulated, learning information for generating each prediction model is increased. Accordingly, the prediction accuracy of each prediction model can be improved.

The groups are created by grouping based on user attributes. According to this, for example, a manager of the information processing apparatus 1 can perform grouping effectively in accordance with experience if the manager knows the relationship between a user attribute and a CTR from experience.

Second Embodiment

Next, a second embodiment is described based on the drawings.

In the first embodiment, groups of users are predetermined by, for example, a manager of the information processing apparatus 1. However, in the second embodiment, users are grouped automatically based on user information, using a Dirichlet process being a statistical technique. The other configurations are similar to those of the first embodiment.

Figure 4:
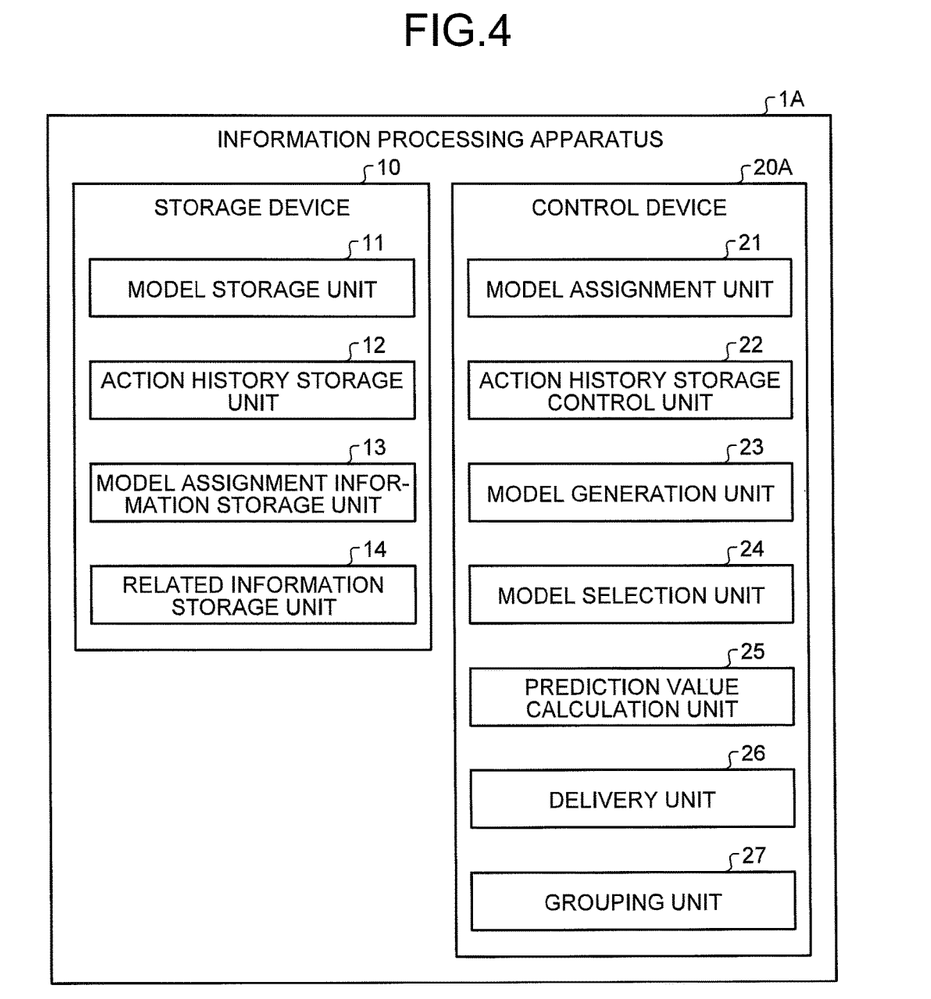
FIG. 4 is a diagram illustrating the configuration of an information processing apparatus according to a second embodiment.

FIG. 4 is a diagram illustrating the configuration of an information processing apparatus of the second embodiment.

As illustrated in FIG. 4, a control device 20A of an information processing apparatus 1A of the second embodiment includes a grouping unit 27 in addition to a model assignment unit 21, an action history storage control unit 22, a model generation unit 23, a model selection unit 24, a prediction value calculation unit 25, and a delivery unit 26, which are the same as those of the first embodiment.

The grouping unit 27 groups the users based on the user information, using a Dirichlet process being a statistical technique.

Specifically, the grouping unit 27 sets a value of a parameter to determine the degree of gathering in the Dirichlet process in several levels, and performs several types of groupings.

More specifically, the grouping unit 27 groups users using a Dirichlet process, based on user information (such as user attributes and the number of click histories (the number of logs) accumulated in the action history storage unit 12) being information related to the users.

For example, the grouping unit 27 performs several types of groupings where the value of a parameter (also referred to as hyperparameter) that determines the degree of gathering in the Dirichlet process is set in several levels.

For example, three types of groupings are performed setting the value of the hyperparameter to "0.01", "1", and "100".

In the embodiment, the model generation unit 23 generates the prediction model on a group by group basis for each of the several types of groupings by the grouping unit 27.

For example, the model generation unit 23 generates a prediction model on a group by group basis for each of several types of groupings by the grouping unit 27, and stores the generated prediction models in the model storage unit 11.

Operation and Effect of the Second Embodiment

The grouping unit 27 groups users based on user information using a Dirichlet process being a statistical technique. Accordingly, appropriate grouping can be performed automatically in accordance with the user information. Consequently, the prediction accuracy of a prediction model can be improved without depending on the experience of the manager of the information processing apparatus 1.

Third Embodiment

Next, a third embodiment is described.

In the first embodiment, the model assignment unit 21 uses features value acquired from a user's click history to test a plurality of prediction models, and assigns a prediction model suited to the user. However, in the third embodiment, the model assignment unit 21 assigns a prediction model in a method similar to the first embodiment for a predetermined period after the first time the model assignment process is executed, and assigns a prediction model based on related information accumulated for the predetermined period after a lapse of the predetermined period. The other configurations are similar to those of the first embodiment.

In other words, in the embodiment, for a predetermined period (for example, two weeks) after the first time the model assignment process is executed, the model assignment unit 21 uses the features value acquired from the user's click history to test the plurality of prediction models stored in the model storage unit 11, and assigns a prediction model suited to the user in Step S14 as in the first embodiment.

Consequently, in Step S16, related information where the features value acquired in Step S13 is associated with the prediction model assigned in Step S14 is accumulated in the related information storage unit 14 for the predetermined period.

After the predetermined period has passed since the first time the model assignment process was executed, in Step S14, the model assignment unit 21 extracts a prediction model with high relativity with the acquired features and assigns the prediction model to the user based on a regularity of the relationship between the features and the prediction model in the predetermined period's related information accumulated in the related information storage unit 14.

Operation and Effect of the Third Embodiment

The model assignment unit 21 assigns a prediction model suited to a user, based on related information after a lapse of a predetermined period since the first time the model assignment process is executed. Accordingly, there is no need to test prediction models, and the calculation time required to assign a prediction model can be reduced.

The embodiment is not limited to the above-mentioned embodiments, and also includes modifications illustrated below within the scope that can achieve the object of the embodiment.

First Modification

In the embodiments, a prediction model is for calculating a prediction value related to a probability that a user clicks an advertisement. However, the embodiments are not limited to this. In other words, it is simply required to calculate a prediction value related to a probability that a user performs an action on the Internet by operating the user terminal 2. The purchase of a product and the like can be exemplified as such an action.

The information processing apparatus 1 may, for example, make various recommendations or suggestions to the user based on the calculated prediction value.

Second Modification

In the embodiments, the model assignment process is performed for all users whose click histories are accumulated in the action history storage unit 12. However, the embodiments are not limited to this. In other words, the model assignment process may be performed only for part of the users.

Third Modification

In the second embodiment, the grouping unit 27 performs grouping using a Dirichlet process. However, the second embodiment is not limited to this. For example, grouping may be performed using another statistical technique.

Fourth Modification

In the third embodiment, the model assignment unit 21 uses features value acquired from a user's click history to test a plurality of prediction models to assign a prediction model suited to the user for a predetermined period after the first time the model assignment process is executed. However, the third embodiment is not limited to this. For example, if related information where features are associated with a prediction model is created in advance from the experience or the like of the manager of the information processing apparatus 1, a prediction model is extracted based on the related information to be assigned to the user from the first time the model assignment process is executed.

In the present invention, a prediction model is generated for each group created by grouping users based on user information. According to this, each prediction model calculates a prediction value for users having a relatively similar attribute. Accordingly, the number of pieces of features used to calculate a prediction value can be reduced as compared to a case where a prediction value is calculated for all the users.

In the present invention, a prediction model selected from such prediction models generated on a group by group basis is used to calculate a prediction value. Accordingly, the time to calculate a prediction value can be reduced as compared to a case where a prediction model common to all the users is used to calculate a prediction value.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a processor programmed to:
   generate a plurality of prediction models for groups created by grouping a plurality of users based on user information, each of the prediction models calculating a prediction value related to a probability that a user performs an action on the Internet by operating a user terminal;
   for each of the plurality of users:
      acquire a history of actions of a corresponding user,
      acquire a feature value based on the acquired history of actions for the corresponding user,
      test the plurality of prediction models by inputting the feature value of the corresponding user into each of the plurality of prediction models and determining the predicted value for each of the plurality of prediction models, and
      assign a prediction model suited to the corresponding user from the plurality of prediction models, based on a comparison between the predicted value of the assigned prediction model and an actual value associated with the history of actions of the corresponding user;
   from a target user of the plurality of users:
      acquire user information including a history of actions;
      select a prediction model assigned to the target user from the prediction models; and
      calculate a prediction value for the target user via the selected prediction model.

2. The information processing apparatus according to claim 1, wherein the processor generates a common model common among the groups, as the prediction model.

3. The information processing apparatus according to claim 1, wherein the processor is further programmed to:
   obtain a history of actions that the user performed on the Internet by operating the user terminal to test the prediction models, and
   assign a prediction model suited to the target user, wherein
   the processor selects the assigned prediction model.

4. The information processing apparatus according to claim 3, wherein the processor is further programmed to:
   obtain features value acquired from the history of the actions that the user performed on the Internet by operating the user terminal to test the prediction models, the features value including at least one of: a user attribute, a similarity between a delivery target page and an advertisement, a relativity between the user attribute and the advertisement, information on the advertisement, or a past delivery record,
   assign a prediction model suited to the target user,
   generate classification information in which the obtained features value is associated with the assigned prediction model, and
   store the classification information in a memory, and
   after the classification information is stored in the memory for a predetermined period, select a prediction model assigned to the target user based on the stored related information.

5. The information processing apparatus according to claim 1, wherein the processor is further programmed to:
   assign a prediction model suited to the user based on the related information indicating a relationship between the features value related to the actions that the user performed on the Internet by operating the user terminal, and the prediction model, wherein
   the processor selects the assigned prediction model.

6. The information processing apparatus according to claim 1, wherein the processor is further programmed to:
  select a prediction model suited to the user based on the related information indicating the relationship between the features value related to the actions that the user performed on the Internet by operating the user terminal, and the prediction model.

7. The information processing apparatus according to claim 1, wherein the processor is further programmed to:
  store, in a memory, an action history being a history of actions that the user performed on the Internet by operating the user terminal, wherein
  the processor associates the action history with the selected prediction model and stores the action history in the memory, and
  the processor generates the prediction model based on a corresponding action history stored in the memory.

8. The information processing apparatus according to claim 1, wherein the processor generates the prediction model for each group created by grouping the users based on user attributes.

9. The information processing apparatus according to claim 1, wherein the processor is further programmed to:
  group the users based on the user information, via a Dirichlet process being a statistical technique, including:
    setting a value of a parameter to determine the degree of gathering in the Dirichlet process in several levels, and
    performing several types of groupings; and
  generate the prediction model on a group by group basis for each of the several types of groupings.

10. An information processing method to be executed by a computer, comprising:
  generating a plurality of prediction models for groups created by grouping a plurality of users based on user information, each of the prediction models calculating a prediction value related to a probability that a user performs an action on the Internet by operating a user terminal;
  for each of the plurality of users:
    acquiring a history of actions of a corresponding user,
    acquiring a feature value based on the acquired history of actions for the corresponding user,
    testing the plurality of prediction models by inputting the feature value of the corresponding user into each of the plurality of prediction models and determining the predicted value for each of the plurality of prediction models, and
    assigning a prediction model suited to the corresponding user from the plurality of prediction models, based on a comparison between the predicted value of the assigned prediction model and an actual value associated with the history of actions of the corresponding user;
  from a target user of the plurality of users:
    acquiring user information including a history of actions;
    selecting a prediction model assigned to the target user from the prediction models; and
    calculating a prediction value for the target user via the selected prediction model.

11. A non-transitory computer-readable storage medium with an executable program stored thereon, wherein the program instructs a computer to perform:
  generating a plurality of prediction models for groups created by grouping a plurality of users based on user information, each of the prediction models calculating a prediction value related to a probability that a user performs an action on the Internet by operating a user terminal;
  for each of the plurality of users:
    acquiring a history of actions of a corresponding user,
    acquiring a feature value based on the acquired history of actions for the corresponding user,
    testing the plurality of prediction models by inputting the feature value of the corresponding user into each of the plurality of prediction models and determining the predicted value for each of the plurality of prediction models, and
    assigning a prediction model suited to the corresponding user from the plurality of prediction models, based on a comparison between the predicted value of the assigned prediction model and an actual value associated with the history of actions of the corresponding user;
  from a target user of the plurality of users:
    acquiring user information including a history of actions;
    selecting a prediction model assigned to the target user from the prediction models; and
    calculating a prediction value for the target user via the selected prediction model.

* * * * *